May 23, 1939.  C. W. SINCLAIR  2,159,911
METHOD OF MAKING A WHEEL
Original Filed Feb. 23, 1932
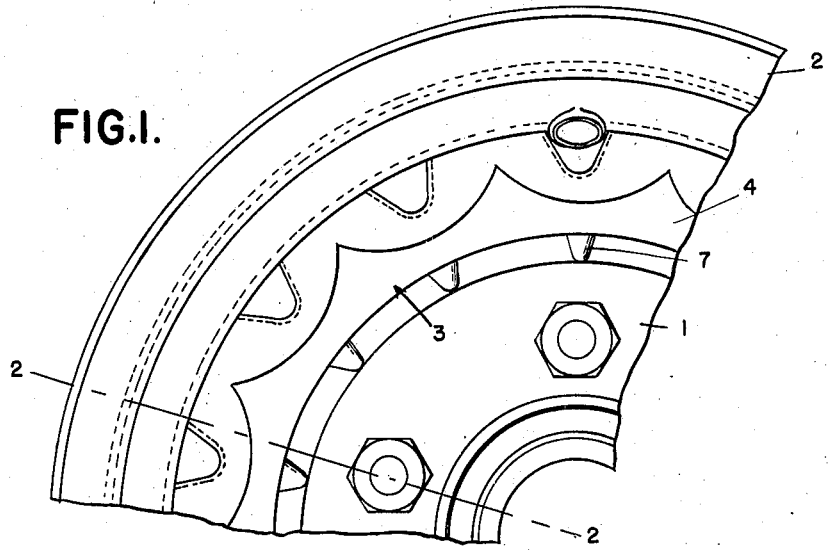
FIG.I.
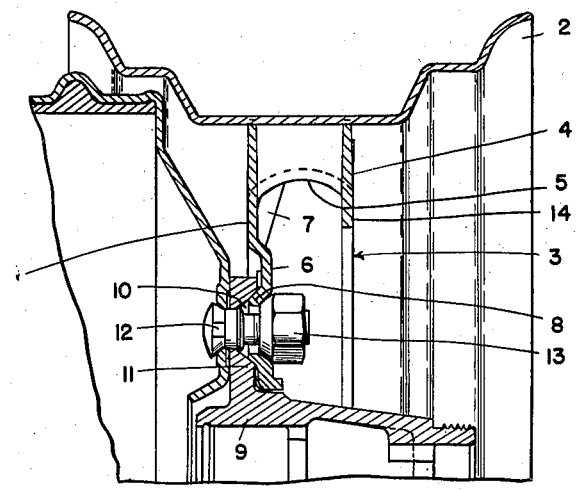
FIG.2.
FIG.3.
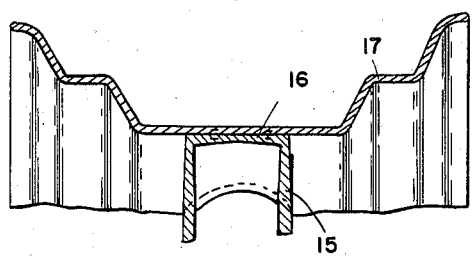
*INVENTOR*
CHARLES W. SINCLAIR
BY
Whittemore Hulbert & Belknap
*ATTORNEYS*

Patented May 23, 1939

2,159,911

UNITED STATES PATENT OFFICE 2,159,911

METHOD OF MAKING A WHEEL

Charles W. Sinclair, Detroit, Mich., assignor to Kelsey-Hayes Wheel Company, Detroit, Mich., a corporation of Delaware Original application February 23, 1932, Serial No. 594,685, now Patent No. 2,120,631, dated June 14, 1938. Divided and this application July 26, 1937, Serial No. 155,802

4 Claims. (Cl. 29—159.03)

The invention relates to methods of making wheels and refers more particularly to methods of making wheels of the artillery type adapted for use particularly with motor vehicles.

The invention has for one of its objects to provide an improved method of construction of artillery type wheel which may be economically carried out. The invention has for other objects to provide a method of making a wheel that may be demounted from the inner hub; and to provide a method of making a wheel that is formed in one piece.

These and other objects of the invention will become apparent from the following description, taken in connection with the accompanying drawing, in which Figure 1 is a fragmentary front elevation of a wheel showing an embodiment of my invention;

Figure 2 is a cross section on the line 2—2 of Figure 1;

Figure 3 is a view similar to Figure 2 showing another embodiment of my invention.

The wheel embodying my invention is a demountable sheet metal wheel of the artillery type and comprises the sheet metal wheel body 1 and the rim member 2, the wheel body being formed of the outer hub member 3 and the spokes 4 integral therewith. The outer hub member has the peripheral annular portion 5 and the inwardly extending mounting portion 6, which latter extends radially inwardly from the rear or inboard edge of the annular portion. The mounting portion is in the nature of an internal annular flange and it is preferably reinforced by means of the radially extending ribs 7 which merge into the annular portion between adjacent spokes. The mounting portion is provided with the annular series of driving projections 8 which are tapered and extend rearwardly or in an inboard direction and which are adapted when the wheel is mounted upon the inner hub member 9 to engage the tapered recesses 10 in the fixed flange 11 of the inner hub member. For detachably securing the wheel to the inner hub member, suitable securing members, such as the bolts 12 extending through the driving projections and the nuts 13 threaded upon the bolts are provided. The outer hub member also has the flange 14 which extends radially inwardly from the front or outboard edge of the annular portion and which terminates in a zone radially outwardly of the securing nuts a sufficient distance to provide for ready accessibility thereto. With this construction it will be noted that the nuts are enclosed within the outer hub member and at the same time are readily accessible. The spokes 4 are tubular and extend radially outwardly from the annular portion 5 and have their roots merging thereinto. The annular portion is of relatively great diameter and the spokes are relatively short. Furthermore, the walls of the spokes are seamless and preferably progressively decrease in thickness from their inner to their outer ends. The rim member 2 is a metal tire carrying rim of the drop-center type having the base of its well mounted upon and fixedly secured to the outer ends of the spokes as by welding.

The wheel body comprising the outer hub member 3 and the spokes 4 integral therewith are formed from a single sheet metal disc-like blank in suitable apparatus which is designed to first press the blank to substantially cup-shape, to then flange the peripheral annular portion of the cup-shaped blank, and to then draw the metal from the peripheral annular portion of the cup-shaped blank radially outwardly to produce the spokes. During the first step, the perimeter of the disc-like blank is laterally bent out of the plane of the blank to thereby produce a blank having a peripheral annular portion and a radial portion at one edge of and extending inwardly from the annular portion. During the second step, the free edge of the peripheral annular portion of the cup-shaped blank is bent radially inwardly to form a flange. During the third step, the under or inner side of the peripheral annular portion is acted upon in a direction substantially normal to the annular portion to press out the spokes in a radially outward direction. A force opposed to the radially outwardly acting force is exerted against the upper or outer side of the peripheral annular portion other than that from which the spokes emerge to produce the desired shape of peripheral annular portion. These spokes are cup-shaped and seamless and have integral outer ends closing the same, the outer ends being removed after the formation of the cup-shaped spokes to produce the wheel shown in Figures 1 and 2.

The modification illustrated in Figure 3 differs essentially from that illustrated in Figures 1 and 2 in that the spokes 15 which correspond to the spokes 4 of Figures 1 and 2 have the integral outer closed ends 16 and these closed ends are suitably secured to the rim member 17 as by welding or riveting. The method of forming the wheel body having these spokes is the same as that above described with reference to Figures 1 and 2, with the exception that the closed ends are not removed.

This application is a division of my copending application Serial No. 594,685, filed February 23, 1932 (now Patent No. 2,120,631, granted June 14, 1938).

What I claim as my invention is:

1. The method of making an artillery vehicle wheel body, which comprises pressing a disc-like blank to substantially cup form, flanging said blank and pressing cup-shaped spoke bodies radially therefrom by oppositely acting radial forces.

2. The method of making an artillery vehicle wheel body, which comprises pressing a sheet metal member to substantially cup-shape, flanging said member and by oppositely applied forces pressing said flanged member into spider formation having closed end seamless spokes.

3. The method of making an artillery wheel, which comprises laterally bending over the perimeter of a blank sheet out of its plane, and pressing substantially normally to the bent perimetral portion from the under or inner side thereof in its new position to form seamless tubular spokes.

4. The method of making an artillery wheel, which comprises forming from a single sheet metal blank a blank having an annular peripheral portion and a radial portion at one edge of and extending inwardly from the peripheral portion, pressing substantially normally to the peripheral portion from the under or inner side thereof to form seamless tubular spokes, and securing a rim member upon outer ends of the spokes in radially outwardly spaced relation to the peripheral portion.

CHARLES W. SINCLAIR.